Feb. 27, 1923.
F. MLADINICH.
CAMERA.
FILED APR. 19, 1920.
1,446,576.
2 SHEETS—SHEET 2.
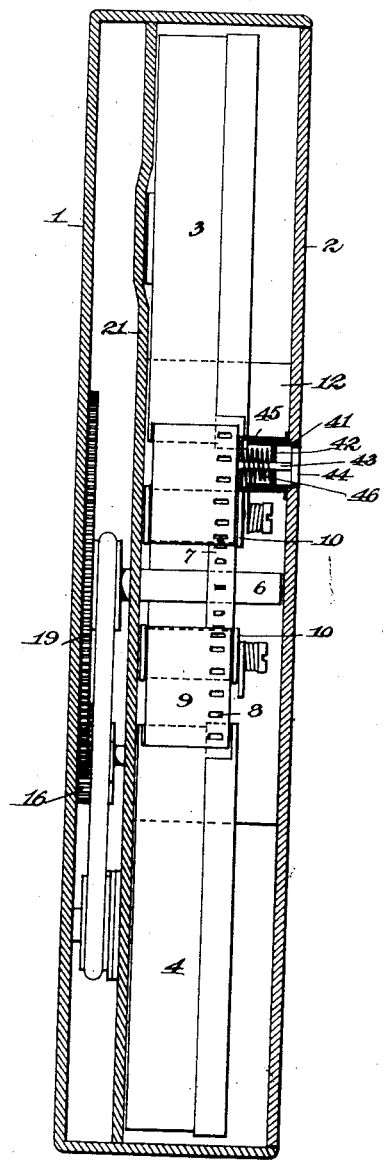
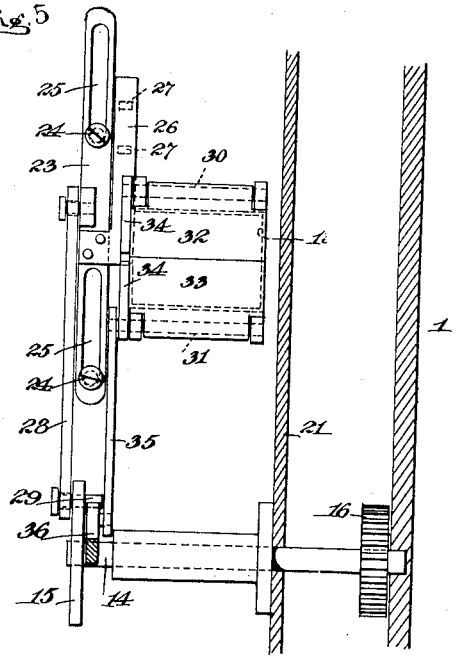
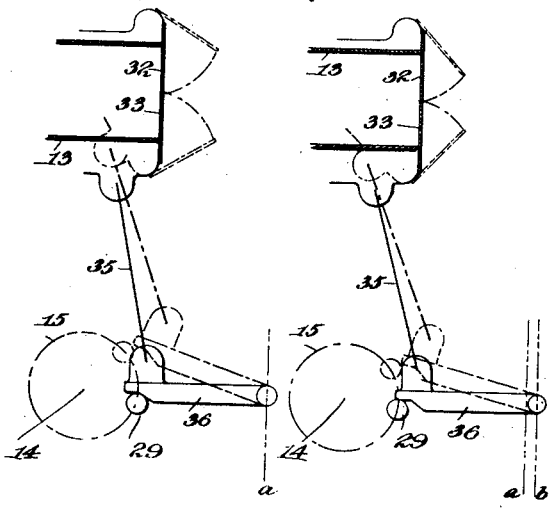
Inventor
Frank Mladinich
by Schechter Kotch
his Attorneys Patented Feb. 27, 1923.

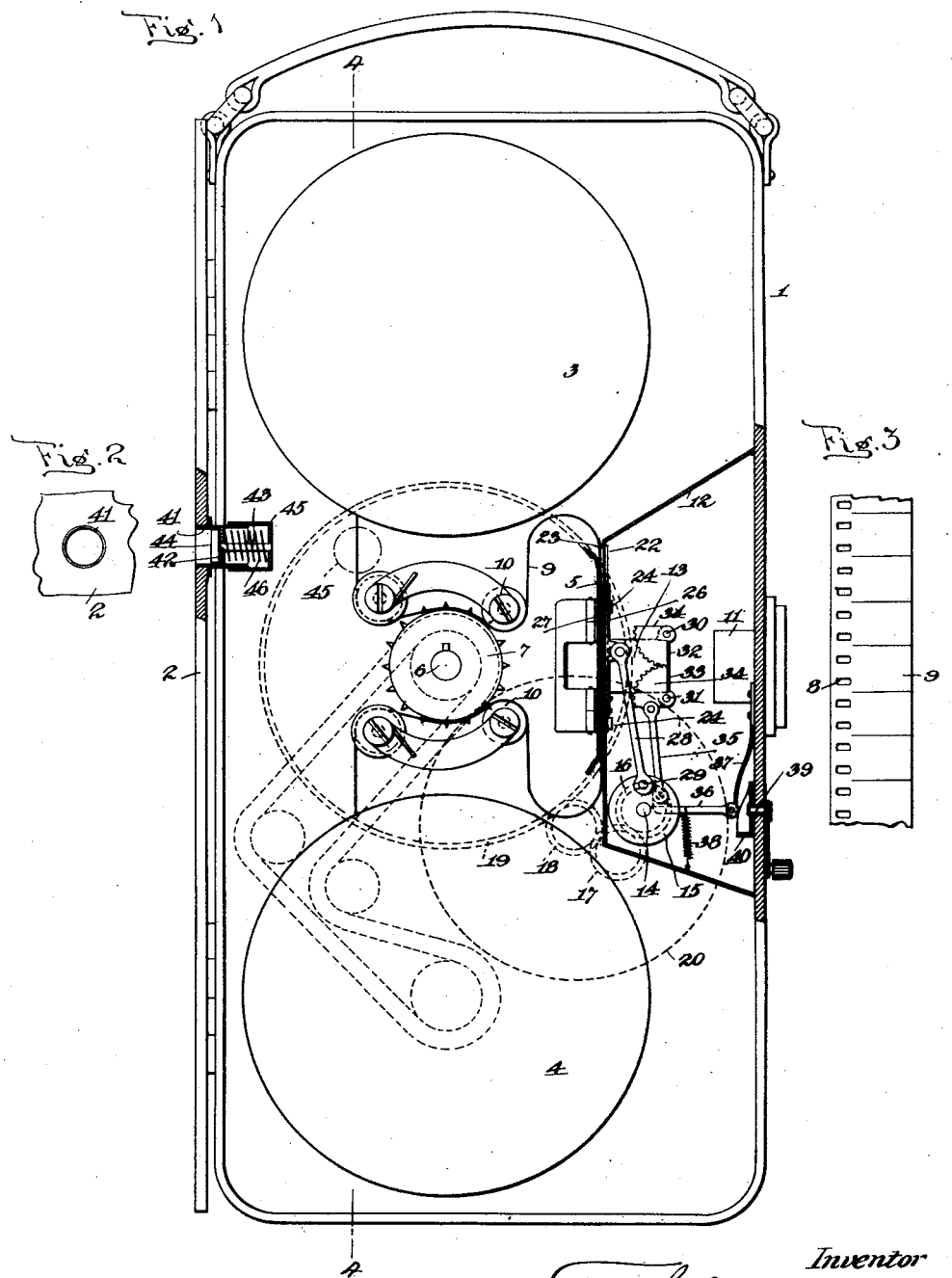

1,446,576

UNITED STATES PATENT OFFICE.

FRANK MLADINICH, OF NEW YORK, N. Y., ASSIGNOR TO H. & N. CARBURETOR CO., INC., A CORPORATION OF NEW YORK.

CAMERA.

Application filed April 19, 1920. Serial No. 374,965.

*To all whom it may concern:*

Be it known that I, FRANK MLADINICH, a citizen of Serbia, and a resident of the borough of the Bronx, county of the Bronx, city and State of New York, have invented a certain new and useful Camera, of which the following is a specification.

My invention relates to cameras for taking photographs on an elongated film for the making of pictures for exhibition in a moving picture projecting machine, and the invention is more particularly directed to a camera for use in making pictures for the so-called "home projectors", wherein a film much narrower than the standard moving picture film is employed and on which the individual pictures are very much smaller than those on the standard films. I desire, however, to have it understood that the invention may be carried out not only in cameras, but also in projecting machines, not only of the home or parlor size, but likewise in cameras and projectors of standard, or any other size.

One of the objects of the invention is to provide a camera suitable to be carried by tourists or the like in place of any ordinary camera or kodak, the apparatus being of a small and compact nature suitable to be so carried and adapted to be manipulated at any time for the purpose of photographing animated pictures as occasion may warrant.

A further object of the invention is to simplify the construction whereby a much cheaper and simpler apparatus may be constructed wherein the diaphragm or stop is eliminated and the shutter is constructed and arranged to act both as a shutter and diaphragm.

A further object of the invention is to provide means observable by the operator to indicate whether there is any film on the supply reel, and to provide means to indicate when the supply reel is empty.

A further object of the invention is the production of a device, of the character herein described, which is extremely simple in construction, neat and attractive in appearance, thoroughly reliable and efficient in its purpose, and economical to manufacture.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The inventive idea involved is capable of receiving a variety of mechanical expressions, one of which for the purpose of illustrating the invention, is shown in the accompanying drawings.

The invention will be first described in connection with the accompanying drawings, wherein similar reference characters are used to designate corresponding parts throughout the several views, and then more specifically defined and indicated in the appended claims.

In the drawings,—

Fig. 1 is a side elevation, partly in section, of a camera with the door in open position;

Fig. 2 is a fragmentary front elevation of a portion of the door;

Fig. 3 is an elevation of a section of film as used in the preferred embodiment of the invention;

Fig. 4 is a section on the line 4—4 of Fig. 1;

Fig. 5 is an enlarged front elevation of shutter operating mechanism;

Figs. 6 and 7 are diagrammatic views illustrating the operation of the shutter.

In carrying out the invention, I employ a casing 1 having a door 2, film supply and take up magazines 3 and 4, and a gate 5, all of any preferred construction. A driving shaft 6 is provided which may be rotated by a crank (not shown). Said crank is removable from the shaft as is common.

Carried on the shaft 6 is a sprocket wheel 7, the teeth of which engage the usual openings 8 in the film 9. The usual presser rolls 10 are employed to retain the film in engagement with the sprocket.

The shaft or spindle of the take up magazine is driven from the shaft 6 by a belt through the usual slipping connection, which is well known in the art and is not illustrated in detail. The sprocket is continuously rotated and the film is formed into the usual loops whereby it, the film, may be intermittently fed across the field of the objective 11 as is common.

A housing 12 is provided between the gate and the objective, and the shutter operating and adjusting mechanisms are located within the housing. The rear of the housing is cut away to enable the film to be exposed to the light transmitted by the objective.

Carried within the housing is a rectangular tube 13. This tube is between the gate and the objective and is separated from the former by a space sufficient for the passage of the film.

Mounted within the housing is a shaft 14, one end of which carries a disc 15. The shaft 14 is geared to the shaft 6 by means of a train of gears 16, 17, 18 and 19, and on the shaft of the gear 18 is a flywheel 20.

The gear train, and the belt for the take up magazine are in a compartment separated from the rest of the mechanism by a partition 21.

Carried on the rear wall 22 of the housing, and to one side of the tube 13, is a slide 23 adapted to be moved vertically. The slide is secured to the wall 22 by means of studs 24 which pass through slots 25 in the slide. Carried by the slide and extending parallel thereto is a light leaf spring 26 provided with teeth or claws 27 adapted to engage the openings 8 in the film 9. The claws 27 are bevelled on their upper faces whereby when the slide is moved upward the spring 26 will be flexed away from the film by the engagement of the bevelled faces with the upper edges of the feed openings and the slide, and with it the spring will move upward and the teeth will engage new openings above those from which they have been disengaged.

The slide 23 is connected by a pitman 28 with a pin 29 which extends through and out on both sides of the disk 15 near the perimeter thereof. As the disk revolves the pin is thus given an orbital movement around the axis of shaft 14. The pitman is connected with that portion of the pin which projects beyond the end of shaft 14 and as the shaft rotates gives a reciprocatory movement to the slide to feed the film downward across the field of the objective.

Mounted on shafts 30 and 31 carried on the tube 13 is a pair of shutter members 32, 33 each capable of closing one-half of the bore of the tube as shown. The shafts 30 and 31 are geared together by means of toothed sectors 34 one of which carries one end of a link 35. The opposite end of the link 35 is pivoted to a bolt 36 having one end supported by means of a leaf spring 37 secured to the front wall of the camera casing. A spring 38 is attached to the bolt 36 and to the housing 12. The free end of the bolt 36 projects into the path of the free end of the wrist pin 29 on the side of the disc 15 opposite the pitman 28 and the tendency of the leaf spring 37 is to withdraw the bolt from the path of the pin.

Mounted in the front wall of the casing is a stud shaft 39. The inner end of this shaft carries a cam 40 against which the spring 37 holds the end of the bolt 36. On the outside of the wall, the shaft 39 is provided with a handle by means of which the shaft, and with it the cam, may be rotated.

Projecting through the door 2 and so positioned therein that it will be in alignment with the edge of the film where the latter leaves the supply magazine 3, is a tube 41 having a partition 42 therein. A stem 43 projects through the partition and carries at its outer end a button 44, and at its inner end an open ended cylinder 45. The cylinder is adapted to slide over the inner end of the tube and a light spring 46 disposed between the partition and the bottom of the cylinder, tends to normally move the cylinder away from the tube. The outer surface of the button 44 is brightly colored in contrast with the outer surface of the casing, and when the spring 46 is compressed the said surface of the button will be at or near the surface of the casing and its color will make it conspicuous. When the spring is extended the button will be moved inward and practically out of sight.

The operation is as follows:—

The sensitized film is placed within the supply magazine 3 and the latter is positioned in the camera. The end of the film is withdrawn from the magazine, passed over the sprocket, formed into an upper loop, carried downward across the field of the objective, formed into a lower loop, and secured to the spindle of the take up magazine.

The door is now closed, and the bottom of the cylinder 45 coming in contact with edge of the film in proximity to the supply magazine, the spring 46 will be compressed and the button 44 will be flush with the outer surface of the door and plainly visible. The camera is now ready for operation.

As the crank is turned the film is fed from one magazine to the other. The slide 23 will be reciprocated and the teeth of the spring 26 engaging the holes in the film will feed the latter intermittently across the field of the lens by the connection of the pitman 28 with the wrist pin on the disc 15.

As the disk rotates the opposite end of the pin 29 will, as it passes through the forward part of its orbit, engage the bolt 36 and raise the free end thereof. This will, through the link 35, oscillate the sectors 34 and thus operate the shutters 32 and 33.

Should the light be poor the cam 40 will be rotated to the position shown in Fig. 1 with the high part bearing against the bolt. The free end of the bolt will project well into the orbit of the pin 29, which will, in the rotation of the disc, have considerable travel before it passes from beneath the pin, and the shutters will be opened to the full extent as shown in Fig. 6.

If the light should be extra bright the cam 40 will be rotated to bring its low position in contact with the bolt and the spring 37 will move the bolt from the position $a$ in Fig. 6 to the position $b$ in Fig. 7. The travel of the pin 29, in contact with the bolt will be much shorter than before and the end of the bolt will not be raised to the same extent. The shutter will now be partly opened as shown in Fig. 7.

The operator by watching the button 44 will know that the film is being properly fed. When the button disappears he will know that the film has run out of the supply magazine or has been broken. This is important as the cameraman will not continue operating only to find, when the film is developed, that a part of his scene has not been taken and the work of actors and cameraman must be done over.

By utilizing the shutter as the stop, the shutter opening is always proportioned to the light without additional adjustment.

In accordance with the provisions of the patent statute, I have described the principle of my invention together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which objects of my invention are attained, and the new results accomplished, as herein set forth, as it is obvious that the particular embodiment herein shown and described is only one of many that can be employed to attain these objects and accomplish these results.

Having now described my invention what I claim and desire to secure by Letters Patent is:

1. A camera having means for intermittently feeding a film, an orbital revolving element for imparting movement to the feeding means, an oscillating shutter, and means for operating the shutter from the orbital revolving element.

2. A camera having means for intermittently feeding a film, an orbital revolving element for imparting movement to the feeding means, an oscillating shutter, means for operating the shutter from the orbital revolving element, and means for adjusting the movement of the shutter.

3. A camera having means for intermittently feeding a film, an orbital revolving element for imparting movement to the feeding means, a pair of oscillating shutters, and means for operating the shutters from the orbital revolving element.

4. A camera having means for intermittently feeding a film, an orbital revolving element for imparting movement to the feeding means, a pair of oscillating shutters, means for operating the shutters from the orbital revolving element, and means for adjusting the movement of the shutters.

5. A camera comprising a light tight casing, means for carrying a film within the casing, a rotary element, connections between the element and the film for intermittently feeding the latter, there being an opening to admit light to the film, shutter members pivoted on opposite sides of the opening, said members being geared together, and connections between the element and a shutter member for oscillating the members.

6. A camera comprising a light tight casing, means for carrying a film within the casing, a rotary element, a pitman between the element and the film for intermittently feeding the latter, there being an opening to admit light to the film, shutter members pivoted on opposite sides of the opening, said members being geared together, and a pitman between the element and a shutter member for oscillating the members.

7. A camera comprising a light tight casing, means for carrying a film within the casing, a rotary element, connections between the element and the film for intermittently feeding the latter, there being an opening to admit light to the film, shutter members pivoted on opposite sides of the opening, said members being geared together, and connections between the element and a shutter member for oscillating the members, and means for adjusting the oscillatory movement of the members.

8. A camera comprising a light tight casing, means for carrying a film within the casing, a rotary element, connections between the element and the film for intermittently feeding the latter, there being an opening to admit light to the film, shutter members pivoted on opposite sides of the opening, said members being geared together, and connections between the element and a shutter member for oscillating the members, and means outside of the casing for adjusting the oscillatory movement of the members.

9. A camera comprising a light tight casing, means for carrying a film within the casing, a rotary element, connections between the element and the film for intermittently feeding the latter, there being an opening to admit light to the film, shutter members pivoted on opposite sides of the opening, said members being geared together, and connections between the element and a shutter member for oscillating the members, and a cam for adjusting the oscillatory movement of the members.

10. A camera comprising a casing, an objective, means for carrying a film within the casing, there being feed openings in the film, a reciprocatory device adapted to engage the openings and intermittently feed the film across the field of the objective, a rotary shaft, a disc on the shaft, a pin carried by the disc, a connection between the disc and film feeding device, an element adapted to be engaged by the pin, an oscillatory shutter, a connection between the element and the shutter whereby movement imparted to the element by the engagement of the pin will oscillate the shutter.

11. A camera comprising a casing, an objective, means for carrying a film within the casing, there being feed openings in the film, a reciprocatory device adapted to engage the openings and intermittently feed the film across the field of the objective, a rotary shaft, a disc on the shaft, a pin carried by the disc, a connection between the disc and film feeding device, an element adapted to be engaged by the pin, an oscillatory shutter, a connection between the element and the shutter whereby movement imparted to the element by the engagement of the pin will oscillate the shutter, and means for adjusting the element relatively to the pin.

12. A camera comprising a casing, an objective, means for carrying a film within the casing, there being feed openings in the film, a reciprocatory device adapted to engage the openings and intermittently feed the film across the field of the objective, a rotary shaft, a disc on the shaft, a pin carried by the disc, a connection between the disc and film feeding device, an element adapted to be engaged by the pin, an oscillatory shutter, a connection between the element and the shutter whereby movement imparted to the element by the engagement of the pin will oscillate the shutter, and means outside of the casing for adjusting the element relatively to the pin.

This specification signed this 31st day of March, 1920.

FRANK MLADINICH.